(12) United States Patent
Kim et al.

(10) Patent No.: US 10,796,824 B2
(45) Date of Patent: Oct. 6, 2020

(54) OPTICAL SIGNAL TRANSFERRING APPARATUS, ELECTRONIC APPARATUS, SOURCE DEVICE, AND METHODS OF OPERATING THE SAME

(71) Applicant: Samsung Electronics Co., Ltd., Suwon-si, Gyeonggi-do (KR)

(72) Inventors: Sunwoo Kim, Suwon-si (KR); Hyunjung Koh, Suwon-si (KR); Jinsub Kim, Suwon-si (KR); Dongjin Park, Suwon-si (KR); Woosub Bang, Suwon-si (KR); Changhun Bae, Suwon-si (KR); Sungki Son, Suwon-si (KR); Seungbok Lee, Suwon-si (KR); Jin Lee, Seoul (KR); Junghwa Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/239,680

(22) Filed: Jan. 4, 2019

(65) Prior Publication Data
US 2019/0206591 A1    Jul. 4, 2019

(30) Foreign Application Priority Data

Jan. 4, 2018    (KR) .......................... 10-2018-0001289

(51) Int. Cl.
*G02B 6/44*    (2006.01)
*H01B 11/22*    (2006.01)
*H01B 7/04*    (2006.01)

(52) U.S. Cl.
CPC ........... *H01B 11/22* (2013.01); *G02B 6/4417* (2013.01); *H01B 7/04* (2013.01)

(58) Field of Classification Search
CPC ......... G02B 6/4447; H01B 11/22; H01B 7/04
(Continued)

(56) References Cited

U.S. PATENT DOCUMENTS 5,313,536 A * 5/1994 Rossi ...................... G02B 6/43
385/14
6,525,849 B1 * 2/2003 Tsao ...................... G01M 11/31
398/67
(Continued)

FOREIGN PATENT DOCUMENTS

JP    2007-294208    11/2007
KR    10-2013-0113161    10/2013
(Continued)

OTHER PUBLICATIONS

International Search Report and Written Opinion of the International Searching Authority dated Apr. 24, 2019 in International Patent Application No. PCT/KR2019/000070.

*Primary Examiner* — Akm E Ullah
(74) *Attorney, Agent, or Firm* — Staas & Halsey LLP

(57) ABSTRACT

An optical signal transferring apparatus, an electronic apparatus, and a source device, and methods of operating the same include a signal transfer unit including one or more signal lines transferring a signal between a first apparatus and a second apparatus and one or more power lines transferring power between the first apparatus and the second apparatus; and a first connector connected to the first apparatus, and a second connector connected to the second apparatus, wherein the signal transfer unit is configured to transfer an optical signal to the second apparatus in response to a power-on input of the first apparatus and transfer, to the first apparatus, power and data which are received from the second apparatus in response to detection of the transferred
(Continued)

optical signal, respectively, via the one or more power lines and the one or more signal lines.

19 Claims, 14 Drawing Sheets

(58) Field of Classification Search
USPC .......................................................... 385/101
See application file for complete search history.

(56) References Cited

U.S. PATENT DOCUMENTS

| | | | | |
|---|---|---|---|---|
| 7,347,632 B2 * | 3/2008 | Farr | ..................... | G02B 6/4246 385/89 |
| 7,548,675 B2 * | 6/2009 | Tatum | .................. | G02B 6/4246 385/100 |
| 7,706,692 B2 * | 4/2010 | Tatum | .................. | G02B 6/4246 398/139 |
| 7,783,146 B2 * | 8/2010 | Blauvelt | ............ | G02B 6/12002 385/30 |
| 9,117,569 B2 | 8/2015 | Cho et al. | | |
| 10,659,167 B1 * | 5/2020 | Son | ...................... | G02B 6/4214 |
| 2002/0044746 A1 | 4/2002 | Kronlund et al. | | |
| 2013/0039653 A1 * | 2/2013 | Finot | .................. | H04B 10/0795 398/38 |
| 2014/0270647 A1 | 9/2014 | Wild | | |
| 2015/0049995 A1 | 2/2015 | Chen | | |
| 2015/0235742 A1 | 8/2015 | Fu et al. | | |
| 2015/0378118 A1 | 12/2015 | Huegerich et al. | | |
| 2016/0139663 A1 | 5/2016 | Binder | | |

FOREIGN PATENT DOCUMENTS

| | | |
|---|---|---|
| KR | 10-2014-0109028 | 9/2014 |
| KR | 10-2015-0060718 | 6/2015 |

* cited by examiner

FIG. 12
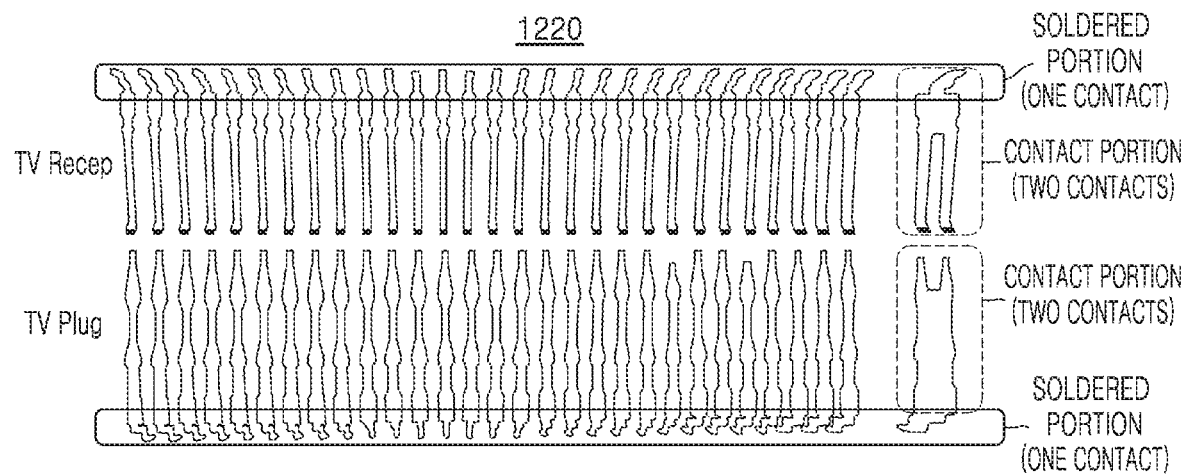
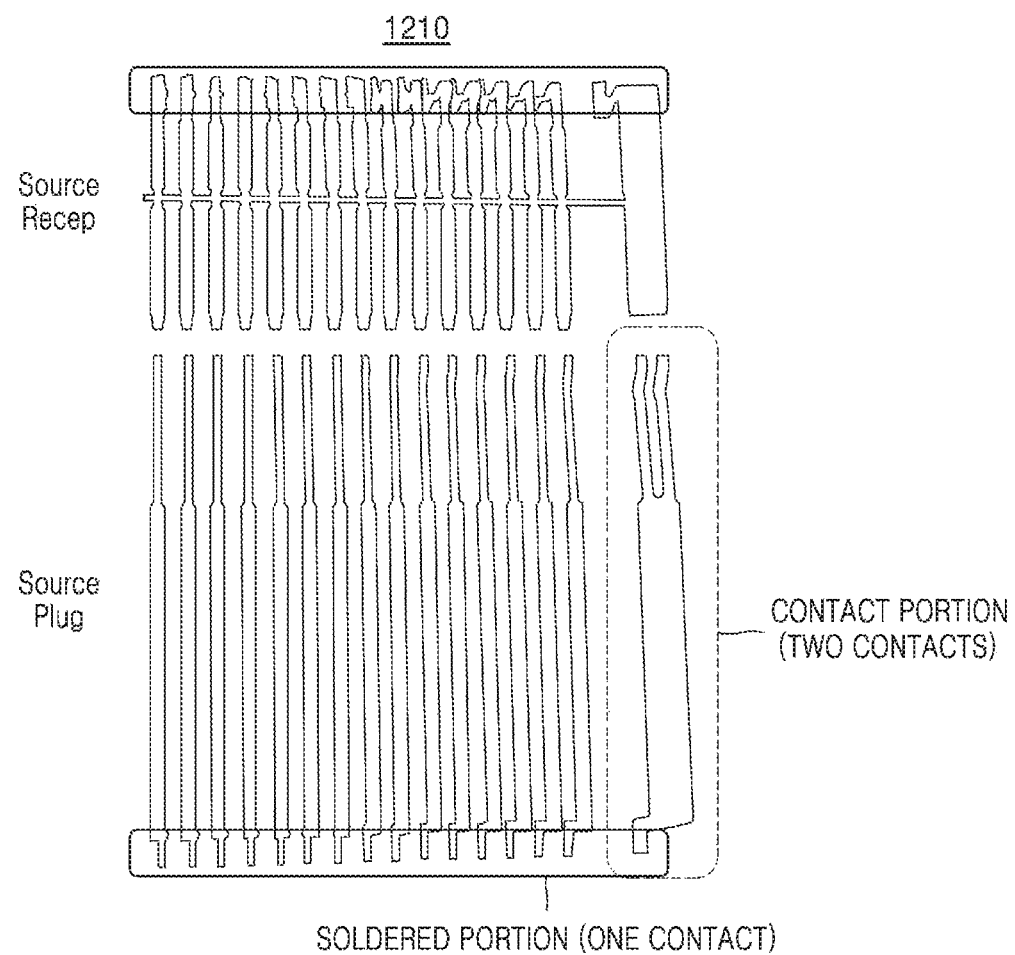

OPTICAL SIGNAL TRANSFERRING APPARATUS, ELECTRONIC APPARATUS, SOURCE DEVICE, AND METHODS OF OPERATING THE SAME

CROSS-REFERENCE TO RELATED APPLICATIONS

This application is based on and claims priority under 35 U.S.C. § 119 to Korean Patent Application No. 10-2018-0001289, filed on Jan. 4, 2018, in the Korean Intellectual Property Office, the disclosure of which is incorporated by reference herein in its entirety.

BACKGROUND

1. Field

The disclosure relates to an optical signal transferring apparatus, an electronic apparatus, a source device, and methods of operating the same, and more particularly, to an optical signal transferring apparatus capable of transferring power together with an optical signal, an electronic apparatus and a source device that perform operations according to the power transfer by the optical signal transferring apparatus, and methods of operating the same.

2. Description of Related Art

When existing optical cables include only optical fibers to perform signal transfer or existing optical cables including both optical fibers and copper wires are used, individual power cables each exposed to the outside are needed to supply power to respective independent power units of a source device and a display apparatus. Accordingly, in the related art, apparatuses connected to each other via an optical cable respectively need power cables, and thus installation of these apparatuses in environments lacking power terminals is difficult, or an interior decoration effect is degraded.

SUMMARY

Provided is an optical cable including copper wires for power transmission and optical fibers for high-speed signal transmission, and a method of enabling safe utilization of the optical cable by arranging the copper wires for power transmission within the optical cable.

Additional aspects will be set forth in part in the description which follows and, in part, will be apparent from the description, or may be learned by practice of the presented embodiments.

In accordance with an aspect of the disclosure, an optical signal transferring apparatus includes a signal transfer unit including one or more signal lines, each transferring a signal between a first apparatus and a second apparatus and one or more power lines transferring power between the first apparatus and the second apparatus; and a first connector arranged on one end of the signal transfer unit and connected to the first apparatus, and a second connector arranged on another end of the signal transfer unit and connected to the second apparatus, wherein the signal transfer unit is configured to transfer an optical signal to the second apparatus in response to a power-on input of the first apparatus, and transfer, to the first apparatus, power and data which are received from the second apparatus in response to detection of the transferred optical signal, respectively via the one or more power lines and the one or more signal lines.

The signal transfer unit may include at least one standby power line and at least one main power line, and may be further configured to transfer main power by using the at least one main power line, in response to the detection of the optical signal.

The signal transfer unit may be further configured to block transferring of the optical signal to the second apparatus in response to a power-off input of the first apparatus and block supply of the power from the second apparatus to the first apparatus in response to detection of the blocking of the transferring of the optical signal.

The signal transfer unit may include at least one standby power line and at least one main power line, and may be further configured to transfer standby power received from the second apparatus to the first apparatus via the at least one standby power line, in response to recognition that the first connector is connected to the first apparatus and the second connector is connected to the second apparatus, and transfer main power received from the second apparatus to the first apparatus via the at least one main power line in response to the power-on input of the first apparatus.

Each of the first connector and the second connector may include one or more printed circuit boards (PCBs), and the one or more signal lines and the one or more power lines may be arranged apart from each other on each of the PCBs.

The one or more signal lines may include a detection signal line for recognizing a detection signal, and a pin corresponding to the detection signal line may have a shorter length than a length of another signal line.

The first apparatus may be a receiving apparatus configured to receive a video/audio signal, and the second apparatus may be a transmitting apparatus configured to transmit the video/audio signal.

In accordance with an aspect of the disclosure, an electronic apparatus includes an interface configured to provide a connection to an optical signal transferring apparatus that transfers data and power from a source device to the electronic apparatus; a power controller configured to control the power received from the optical signal transferring apparatus; and a processor configured to control the interface to generate an optical signal in the optical signal transferring apparatus in response to a power-on input of the electronic apparatus, receive the power and the data from the source device via the optical signal transferring apparatus in response to detection of the generated optical signal, and process the received data.

The processor may be further configured to toggle one predetermined pin from among a plurality of pins provided on the interface in order to generate the optical signal within the optical signal transferring apparatus, and receive main power from the source device via a main power line of the optical signal transferring apparatus in response to detection of the optical signal generated according to the toggling.

The processor may be further configured to control the interface to block generation of the optical signal in the optical signal transferring apparatus in response to an input of powering off the electronic apparatus, and enter a standby mode according to interruption of the supply of the power from the source device in response to the blocking of the generation of the optical signal.

In accordance with an aspect of the disclosure, a source device includes an interface configured to provide a connection to an optical signal transferring apparatus that transfers data and power from the source device to an electronic apparatus; a power controller configured to control the power received from the optical signal transferring apparatus; and a processor configured to detect an optical signal generated by the optical signal transferring apparatus in response to a power-on input of the electronic apparatus and received from the optical signal transferring apparatus, and transfer the power and the data to the electronic apparatus via the optical signal transferring apparatus in response to detection of the optical signal.

The processor may be further configured to control the power controller to transmit standby power in response to connection of the optical signal transferring apparatus, and control the power controller to transmit main power in response to detection of the optical signal.

The processor may be further configured to detect blocking of transferring of the optical signal in the optical signal transferring apparatus, in response to an input of powering off the electronic apparatus, and control the power controller to interrupt the supply of the power to the source device in response to detection of the blocking of the transferring of the optical signal.

In accordance with an aspect of the disclosure, a method of operating an optical signal transferring apparatus, the optical signal transferring apparatus including a signal transfer unit including one or more signal lines for transferring a signal between a first apparatus and a second apparatus, and one or more power lines for transmitting power between the first apparatus and the second apparatus; and a first connector arranged on one end of the signal transfer unit and connected to the first apparatus and a second connector arranged on another end of the signal transfer unit and connected to the second apparatus, includes the operations of transferring an optical signal to the second apparatus in response to a power-on input of the first apparatus; and transferring, to the first apparatus, power and data which are received from the second apparatus in response to detection of the transferred optical signal, respectively via the one or more power lines and the one or more signal lines.

In accordance with an aspect of the disclosure, a method of operating an electronic apparatus, the electronic apparatus including an interface configured to provide a connection to an optical signal transferring apparatus configured to transfer data and power from a source device to the electronic apparatus; a power controller configured to control the power received from the optical signal transferring apparatus; and a processor, includes the operations of controlling the interface to generate an optical signal in the optical signal transferring apparatus in response to a power-on input of the electronic apparatus; receiving the power and the data from the source device via the optical signal transferring apparatus in response to detection of the generated optical signal; and processing the received data.

In accordance with an aspect of the disclosure, a method of operating a source device, the source apparatus including an interface configured to provide a connection to an optical signal transferring apparatus configured to transfer data and power from the source device to an electronic apparatus; a power controller configured to control the power received from the optical signal transferring apparatus; and a processor, includes the operations of detecting an optical signal generated by the optical signal transferring apparatus in response to a power-on input of the electronic apparatus and received from the optical signal transferring apparatus; and transferring the power and the data to the electronic apparatus via the optical signal transferring apparatus in response to detection of the optical signal.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 illustrates respective pin structures of plugs arranged on both ends of an optical fiber cable, according to an embodiment;

DETAILED DESCRIPTION

Figure 1:
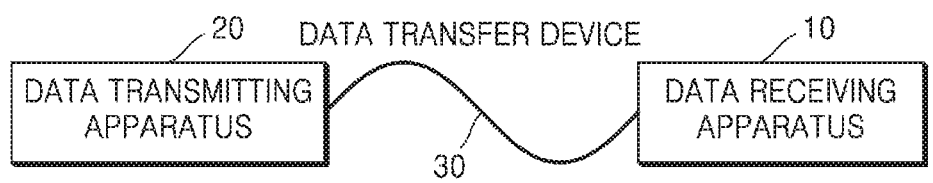
FIG. 1 is a reference diagram of a data transferring system according to various exemplary embodiments.

Reference will now be made in detail to embodiments, examples of which are illustrated in the accompanying drawings. A method of constructing and using an electronic device, according to an embodiment of the present disclosure, will now also be described with reference to the accompanying drawings. Like reference numerals or characters in the drawings denote parts or components that perform substantially the same function.

While such terms as "first", "second", etc., may be used to describe various components, such components must not be limited to the above terms. The terms first and second should not be used to attach any order of importance but are used to distinguish one element from another element. For example, a first component discussed below could be termed a second component, and similarly, a second component may be termed a first component without departing from the teachings of this disclosure. The term "and/or" includes any and all combinations of one or more of the associated listed items.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Various embodiments now will be described with reference to the accompanying drawings.

FIG. 1 is a reference diagram of a data transferring system according to various exemplary embodiments.

Referring to FIG. 1, a system according to various embodiments includes a data receiving apparatus 10, a data transmitting apparatus 20, and a data transfer device 30.

The data receiving apparatus 10 may receive data from the data transmitting apparatus 20 via the data transfer device 30, and may display or reproduce the received data. The data receiving apparatus 10 may include a connecting part to be connected to the data transfer device 30. The data receiving apparatus 10 may include a multimedia reproducing apparatus, such as a television (TV) or an audio player.

The data transmitting apparatus 20 may transmit data to the data receiving apparatus 10 via the data transfer device 30, in response to a request from the data receiving apparatus 10 or based on a determination by the data transmitting apparatus 20. The data transmitting apparatus 20 may include a connecting part to be connected to the data transfer device 30. The data transmitting apparatus 20 may include a multimedia supplying apparatus, such as a set-top box or a data box.

The data transfer device 30 may transfer data received from the data transmitting apparatus 20 to the data receiving apparatus 10. The data transfer device 30 may include a connecting part for connection to the data transmitting apparatus 20 and another connecting part for connection to the data receiving apparatus 10. The data transfer device 30 may include, for example, an optical fiber cable.

The data transfer device 30 may include one or more signal lines which are configured to transfer a data signal, and one or more power lines which are configured to transmit power. The one or more signal lines may consist of optical fibers, and the one or more power lines may consist of copper wires.

The one or more power lines may include one or more standby power lines that transmit standby power for maintaining a standby mode, when the data transmitting apparatus 20 and the data receiving apparatus 10 are in the standby mode, and one or more main power lines that transmit main power for maintaining an operation mode, when the data transmitting apparatus 20 and the data receiving apparatus 10 are in the operation mode.

In the present specification, a data transmitting apparatus or a data receiving apparatus may be referred to as an electronic apparatus, and an apparatus that is disposed on the outside of the electronic apparatus may be referred to as an external apparatus.

Figure 2:
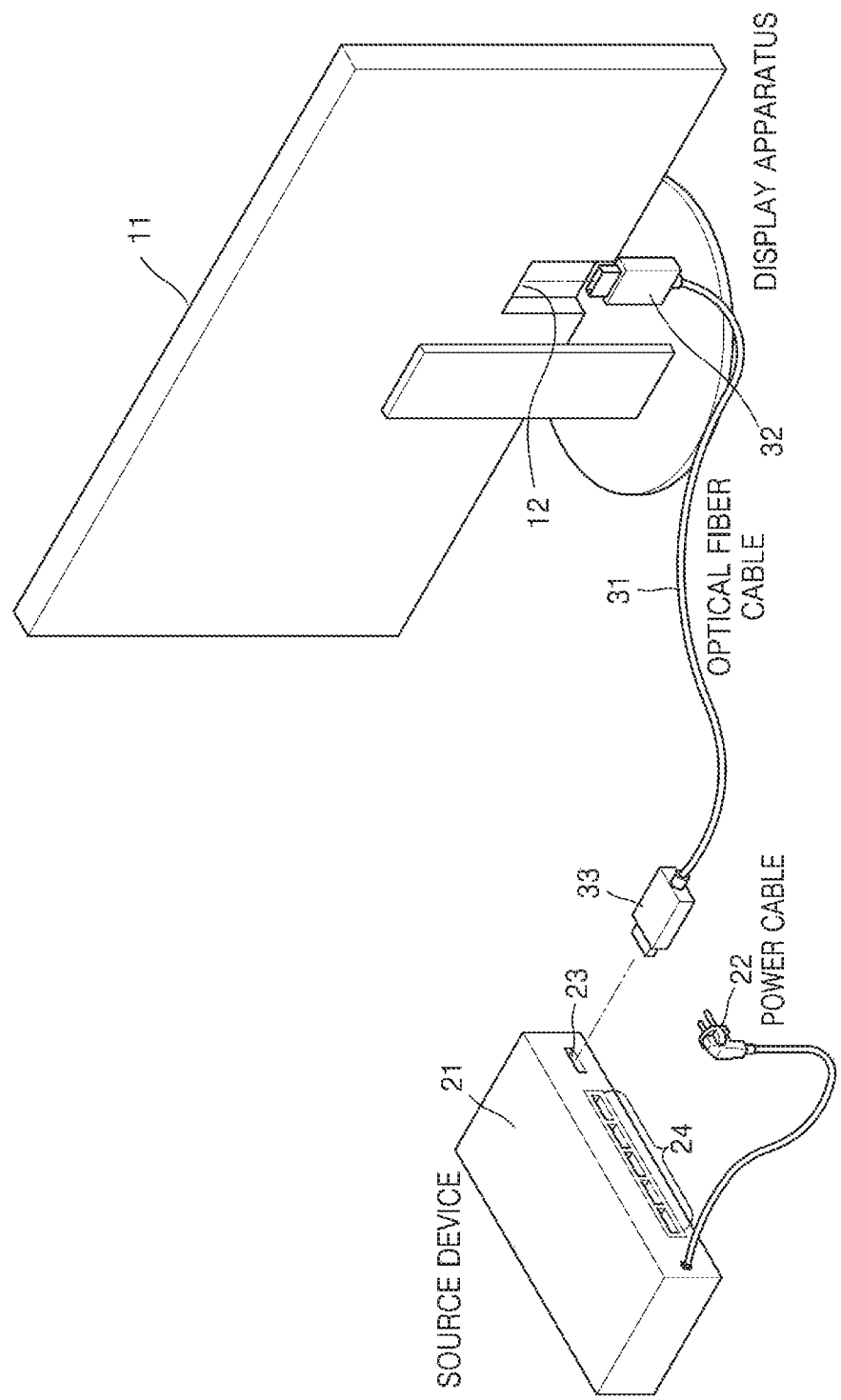
FIG. 2 is a diagram for describing data transfer between a source device and a display apparatus, according to an embodiment.

FIG. 2 is a diagram for describing data transfer between the data transmitting apparatus 20 and the data receiving apparatus 10, according to an embodiment.

Referring to FIG. 2, a display apparatus 11 is illustrated as an example of the data receiving apparatus 10, a source device 21 is illustrated as an example of the data transmitting apparatus 20, and an optical fiber cable 31 is illustrated as an example of the data transfer device 30.

The display apparatus 11 may be embodied as a TV which is configured to display a broadcasting image based on a broadcasting signal, broadcasting information, or broadcasting data received from transmitting equipment of a broadcasting station. The display apparatus 11 may display not only a TV signal but may also display images, such as a moving picture, based on signals or data having various image-displayable formats, a still image, an application, an on-screen display (OSD), a graphical user interface (GUI) for controlling various operations, or the like. The display apparatus 11 may have a port 12 configured for providing a physical and electrical connection to the optical fiber cable 31.

The source device 21 may be manufactured to be portable so as to be easily carried and replaced, and may transmit data from various supply sources to the display apparatus 11 via the optical fiber cable 31. The source device 21 may have a port 23 configured for providing a physical and electrical connection to the optical fiber cable 31. In addition to the optical fiber cable port 23, the source device 21 may also have one or more input/output (I/O) ports 24 configured for receiving data from various image sources of supply.

The source device 21 may include a power cable 22 for receiving power. The power received via the power cable 22 may be supplied not only to the components of the source device 21, but may also be supplied to the components of the display apparatus 11 when the display apparatus 11 is connected to the source device 21 via the optical fiber cable 31, and accordingly may be used to operate the display apparatus 11. In the TV field, there is a recent trend toward removing lines in order to increase an aesthetic effect in the case of wall-mountable TVs or even in stand-type TVs. Accordingly, an interior decoration effect may be greatly increased by removing a power cable from the display apparatus 11 by using the optical fiber cable 31.

The optical fiber cable 31 may have a connector 32 configured for providing a physical and electrical connection to the display apparatus 11, and a connector 33 configured for providing a physical and electrical connection to the source device 21. The optical fiber cable 31 may receive data from the source device 21 via the connector 33, and may transmit the received data to the display apparatus 11 via the connector 32.

The optical fiber cable 31 according to the present embodiment may include a plurality of signal lines for transmitting data, and one or more power lines.

The optical fiber cable 31 according to the present embodiment provides power received from the source device 21 to the display apparatus 11 by using the one or more power lines, thereby removing a special power cable from the display apparatus 11.

The optical fiber cable 31 according to the present embodiment may safely perform power transfer from the source device 21 to the display apparatus 11 by including a special operation mode when providing power by using the one or more power lines.

The optical fiber cable 31 according to the present embodiment may have a connector structure for providing safe power transfer, by including the one or more power lines.

Although the optical fiber cable 31 provides the power received from the source device 21 to the display apparatus 11 by using the one or more power lines in FIG. 2, the optical fiber cable 31 may transfer power received from the display apparatus 11 to the source device 21 by using the one or more power lines.

Figure 3:
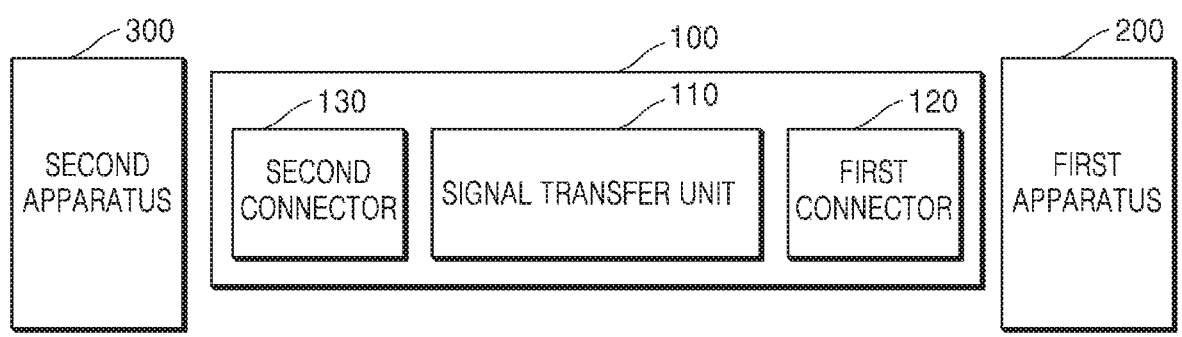
FIG. 3 is a block diagram of a system including an optical signal transferring apparatus and external apparatuses connected to the optical signal transferring apparatus, according to an embodiment.

FIG. 3 is a block diagram of a system including an optical signal transferring apparatus and external apparatuses connected to the optical signal transferring apparatus, according to an embodiment.

Referring to FIG. 3, the system may include an optical signal transferring apparatus 100, a first apparatus 200, and a second apparatus 300.

The optical signal transferring apparatus 100 may include a signal transfer unit 110 including one or more signal lines for transferring a signal between the first apparatus 200 and the second apparatus 300, and one or more power lines for transmitting power between the first apparatus 200 and the second apparatus 300, a first connector 120 disposed on one end of the signal transfer unit 110 and connected to the first apparatus 200, and a second connector 130 disposed on the other end of the signal transfer unit 110 and connected to the second apparatus 300.

According to an embodiment, the signal transfer unit 110 may transfer an optical signal to the second apparatus 300 in response to a power-on input of the first apparatus 200, and transfer power and data received from the second apparatus 300 to the first apparatus 200 via the one or more power lines and the one or more signal lines in response to detection of the transferred optical signal.

According to an embodiment, the signal transfer unit 110 may include at least one standby power line and at least one main power line, and, in response to such detection signal recognition, the at least one main power line may transfer main power received from the second apparatus 300 to the first apparatus 200.

According to an embodiment, the signal transfer unit 110 may block an optical signal that is transferred to the second apparatus 300, in response to a power-off input of the first apparatus 200, and power supply from the second apparatus 300 may be blocked in response to recognition of the blockage of the optical signal of the second apparatus 300.

According to an embodiment, the signal transfer unit 110 may include the at least one standby power line and the at least one main power line, and may transmit standby power received from the second apparatus 300 to the first apparatus 200 via the at least one standby power line, in response to recognition of the fact that the first connector 120 is connected to the first apparatus 200 and the second connector 130 is connected to the second apparatus 300, and transmit main power received from the second apparatus 300 to the first apparatus 200 via the at least one main power line in response to the power-on input of the first apparatus 200.

According to an embodiment, each of the first connector 120 and the second connector 130 may include one or more printed circuit boards (PCBs), and one or more signal lines and one or more power lines may be arranged apart from each other on each of the PCBs. The one or more signal lines may include a detection signal line for recognizing a detection signal, and a pin of the connector corresponding to the detection signal line may have a smaller length than another signal line.

According to an embodiment, the first apparatus 200 may include an interface for providing a connection to the optical signal transferring apparatus 100 to receive data and power from the second apparatus 300, a power controller for controlling power received from the optical signal transferring apparatus 100, and a processor. The processor may control the interface to generate an optical signal in the optical signal transferring apparatus 100 in response to the power-on input of the first apparatus 200, receive the power and data from the second apparatus 300 via the optical signal transferring apparatus 100 in response to detection of the generated optical signal, and process the received data.

According to an embodiment, the first apparatus 200 may toggle one predetermined pin from among a plurality of pins provided on the interface in order to generate an optical signal within the optical signal transferring apparatus 100, and receive the main power from the second apparatus 300 via the main power line of the optical signal transferring apparatus 100 in response to detection of the optical signal generated according to the toggling.

According to an embodiment, the first apparatus 200 may control the interface to block generation of the optical signal in the optical signal transferring apparatus 100, in response to an input of powering off the first apparatus 200, and may enter a standby mode according to interruption of power supply from the second apparatus 300 in response to blockage of the optical signal.

According to an embodiment, the second apparatus 300 may include an interface for providing a connection to the optical signal transferring apparatus 100 that transfers data and power from the second apparatus 300 to the first apparatus 200, a power controller for controlling power provided to the optical signal transferring apparatus 100, and a processor.

According to an embodiment, the second apparatus 300 may detect the optical signal received from the optical signal transferring apparatus 100 that generates the optical signal in response to a power-on input of the first apparatus 200, and transmit the power and the data to the first apparatus 200 via the optical signal transferring apparatus 100 in response to detection of the optical signal.

According to an embodiment, the second apparatus 300 may control the power controller to transmit standby power in response to a connection of the optical signal transferring apparatus 100, and may control the power controller to transmit main power in response to detection of the optical signal.

According to an embodiment, the second apparatus 300 may detect blockage of the optical signal transfer by the optical signal transferring apparatus 100, in response to the input of powering off the first apparatus 200, and may control the power controller to interrupt power supply to the first apparatus 200 in response to detection of the optical signal blockage.

Figure 4:
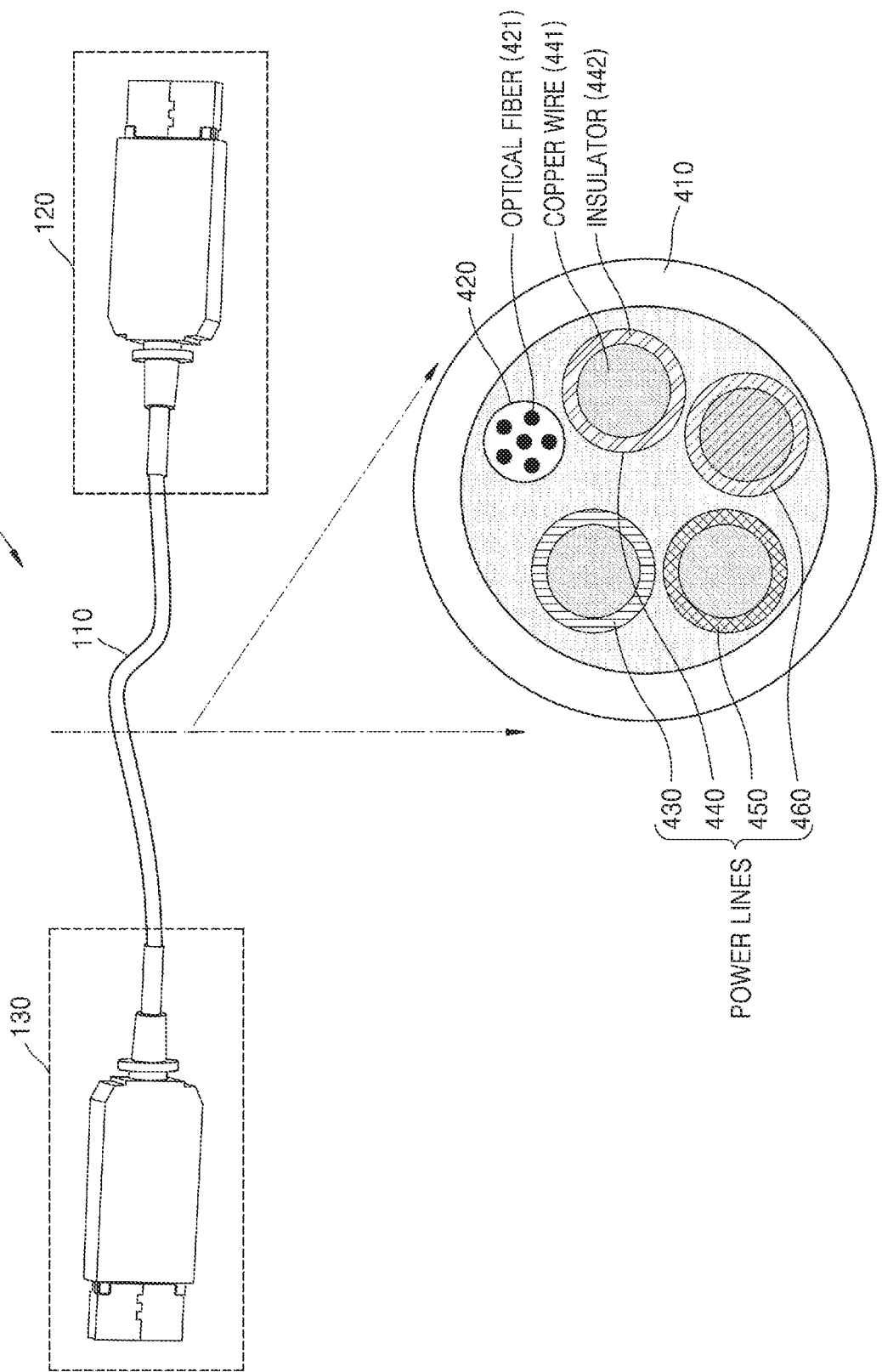
FIG. 4 illustrates a cross-section of an optical fiber cable, which is an example of the optical signal transferring apparatus, according to an embodiment.

FIG. 4 illustrates a cross-section of an optical fiber cable 100, which is an example of the optical signal transferring apparatus 100, according to an embodiment.

Referring to FIG. 4, the signal transfer unit 110 of the optical fiber cable 100 may include one or more optical fibers 420 and one or more copper wires 430, 440, 450, and 460.

Each optical fiber 420 transfers a high-speed signal, such as video, audio, or data. The optical fiber 420 needs to have a minimal exterior sheath to maximize the external diameter of the entire cable. The copper wires 430, 440, 450, and 460 may function to secure durability of the optical fiber cable 100. The copper wires 430, 440, 450, and 460, which are in charge of power conveyance, may protect the optical fibers 420 from an external impact and may increase the strength of the optical fiber cable 100.

The copper wires 430, 440, 450, and 460 transfer power to a data receiving apparatus.

According to an embodiment, the copper wires 430, 440, 450, and 460 transfer at least two types of power such that the data receiving apparatus operates according to display operation modes. The at least two types of power may include a low voltage and a high voltage. Power of the low voltage serves as minimum power necessary in a standby mode of the data receiving apparatus, and the high voltage is used when the data receiving apparatus needs large power while operating in a normal mode.

In terms of outward appearance features, existing copper wires have a brown color that is unique to the copper material, whereas a cable according to the present disclosure may have a silver or gray color similar to an exterior skin color of a cable by coating the copper exterior with tin and preventing oxidation in order to provide a transparency feature.

An insulator 442 surrounding a copper wire 441 may minimize its thickness and also have a sufficient heat-resisting property and a sufficient pressure-resisting property, by using Teflon instead of polyvinyl chloride (PVC) that is generally used in power cables or the like.

A plurality of optical fibers 421, a sheath 410, and wires that constitute an optical fiber cable are all formed of transparent materials to increase light transmittance, and consequently degrade the visibility of the optical fiber cable.

Figure 5:
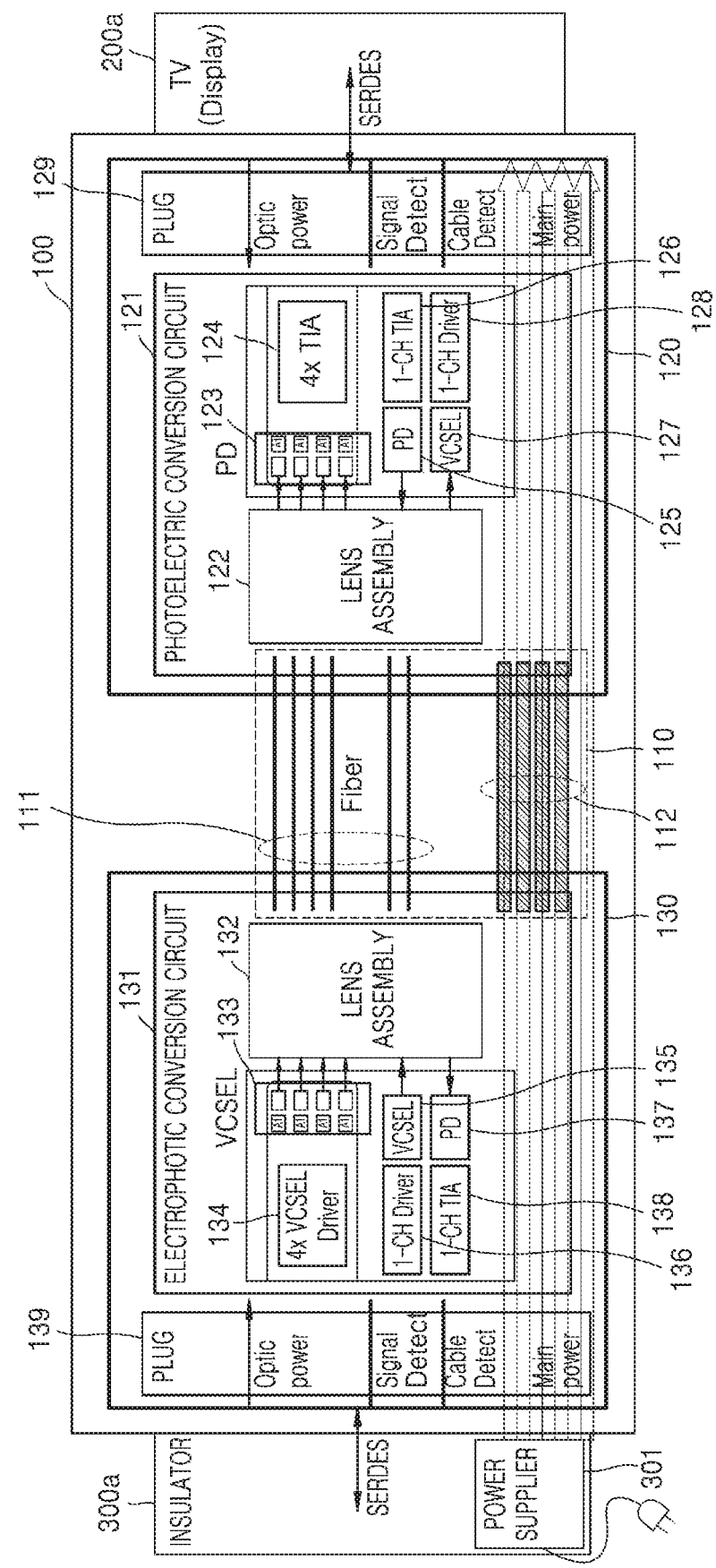
FIG. 5 is a schematic diagram for explaining a detailed structure of the optical signal transferring apparatus, according to an embodiment.

FIG. 5 is a schematic diagram for explaining a detailed structure of the optical signal transferring apparatus 100, according to an embodiment.

FIG. 5 illustrates the optical signal transferring apparatus 100, a display apparatus 200a as an example of the first apparatus 200, and a source device 300a as an example of the second apparatus 300.

The source device 300a as an example of the second apparatus 300 includes a power supplier 301 that supplies power to each component of the source device 300a. For example, the power supplier 301 may include a switched mode power supply (SMPS) that receives commonly used 220V alternating current (AC) power as an input and rectifies the received 220V AC power into a direct current (DC) power according to necessity. By removing a power code directly connected for power supply from the display apparatus 200a and adding copper wires intended for power supply to a signal transfer cable that connects the source device 300a to the display apparatus 200a, the power supplier 301 of the source device 300a may supply power needed by the display apparatus 200a. For example, power that is transferred to the display apparatus 200a may be DC power of 300V or greater instead of commonly-used 220V AC power. This high-voltage DC power utilization may satisfy the specifications of a safer and thinner power cable, compared with AC power.

Because the optical signal transferring apparatus 100 includes a power line that transfers a high voltage, the power supplier 301 may include a microcomputer including an algorithm for providing a safe operation mode.

The source device 300a may include an external input port, such as a tuner, a universal serial bus (USB), or a high-definition multimedia interface (HDMI), to connect various video/audio signal sources. The source device 300a transfers a signal corresponding to an input port selected by a user from among these external input ports to the display apparatus 200a such that the signal may be output by the display apparatus 200a.

The display apparatus 200a as an example of the first apparatus 200 includes a power supply that supplies power to each component of the display apparatus 200a. The power supply may include a power unit that increases/decreases the power received from the source device 300a to an appropriate level of voltage in order to change the received power to power suitable for display apparatuses. Because the optical signal transferring apparatus 100 includes a power line that transfers a high voltage, the power supply may include a microcomputer including an algorithm for providing a safe operation mode.

The display apparatus 200a may further include a series of electric circuits and a panel for displaying a video/audio signal received from the source device 300a on a display.

The optical signal transferring apparatus 100 may include the signal transfer unit 110, the first connector 120, and the second connector 130.

The signal transfer unit 110 may include a signal line 111 formed of a plurality of optical fibers for transferring a video/audio signal and a data signal for control, and a power line 112 formed of one or more copper wires for power transmission.

The first connector 120 may include a photoelectric conversion circuit 121 that converts an optical signal received via an optical fiber line of the optical signal transferring apparatus 100 into an electrical signal, and a plug 129 including a plurality of pins to connect the first connector 120 to the display apparatus 200a.

The photoelectric conversion circuit 121 may include a lens assembly 122, which is an optical signal alignment lens assembly (OSA) for focusing an optical signal output via an optical fiber on a photo-detector (PD), a PD 123, a transimpedance amplifier (TIA) 124, a PD 125, a TIA 126, a vertical cavity surface emitting laser (VCSEL) 127, and a VCSEL driver 128.

The PD 123 may convert received light into an electrical signal and may transmit the electrical signal to a TIA 124. The TIA 124 is an amplifier that is configured to convert current to a voltage, and may amplify the electrical signal received from the PD 123 and may transfer the amplified electrical signal to a Serializer/Deserializer (SerDes). The PD 123 and the TIA 124 may process a signal from a plurality of optical fiber lines corresponding to a video/audio signal, and the PD 125 and the TIA 126 may process a control signal.

The VCSEL driver 128 is a circuit that is configured to control and drive one or more VCSELs 127 by receiving data from a SerDes. The VCSEL 127 is a laser diode that is configured to convert an electrical signal received from the VCSEL driver 128 to an optical signal.

The VCSEL 127 and the VCSEL driver 128 may process a control signal.

The plug 129 may include a high-speed signal pin, a general signal pin, and a power pin.

The second connector 130 may include an electrophotic conversion circuit 131 that converts a video/audio signal in an electrical format received from the source device 300a into an optical signal in order to transmit the video/audio signal via the optical fiber line, and a plug 139 including a plurality of pins to connect the second connector 130 to the source device 300a.

The electrophotic conversion circuit 131 may include a lens assembly 132, which is an OSA for focusing a laser output by a VCSEL on an optical fiber, a VCSEL 133, a VCSEL driver 134, a VCSEL 135, a VCSEL driver 136, a PD 137, and a TIA 138.

The plug 139 may include a high-speed signal pin, a general signal pin, and a power pin.

Because the video/audio signal is transferred from the source device 300a to the display apparatus 200a but a data signal (remote signal or other signals) for control is bilaterally communicated between the source device 300a and the display apparatus 200a, the electrophotic conversion circuit 131 and the photoelectric conversion circuit 121 may be complexly configured between the first connector 120 and the second connector 130.

Figure 6:
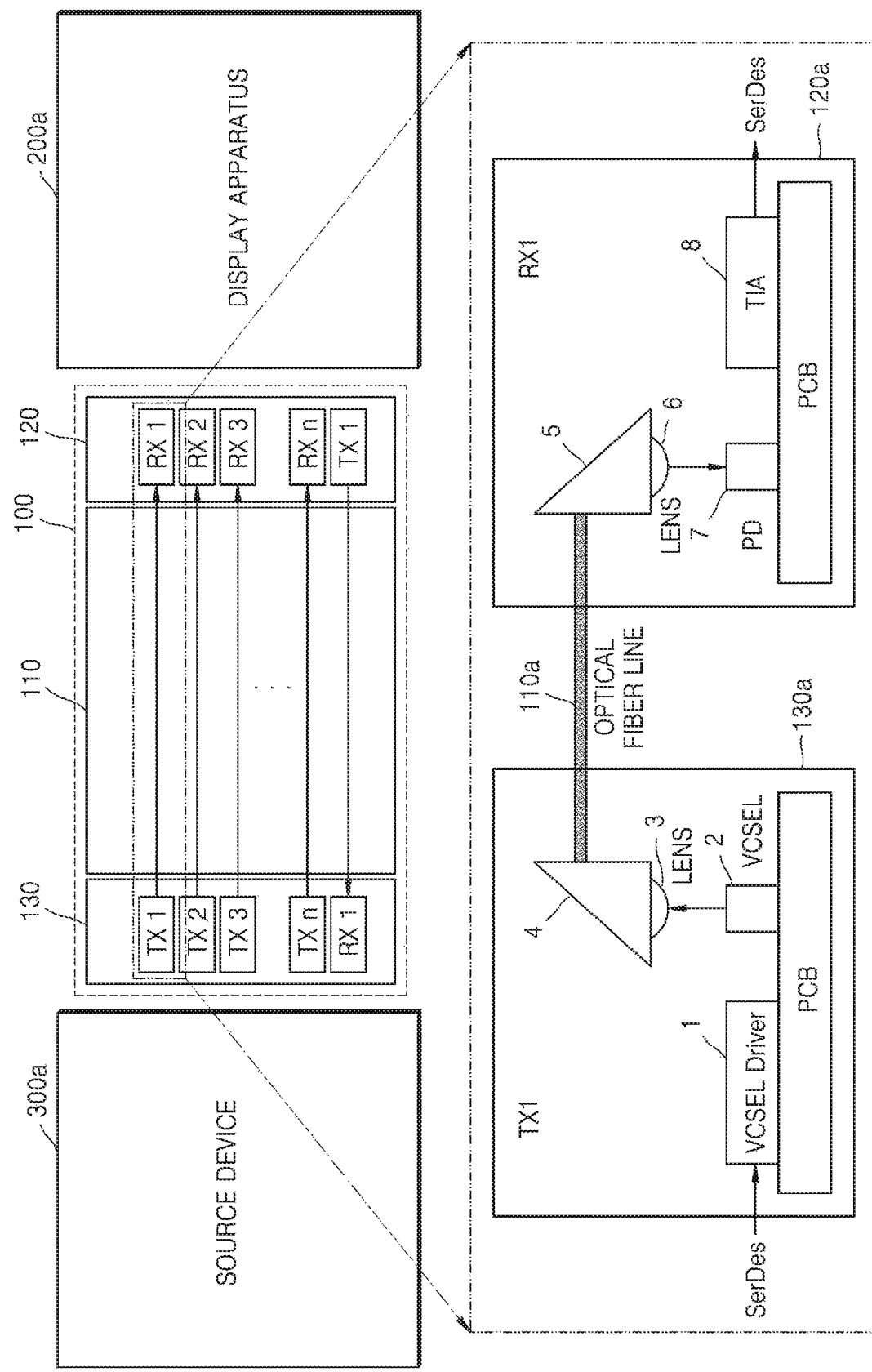
FIG. 6 is a schematic diagram for explaining a detailed structure of each optical signal line included in the optical signal transferring apparatus, according to an embodiment.

FIG. 6 is a schematic diagram for explaining a detailed structure of each optical signal line included in the optical signal transferring apparatus 100, according to an embodiment.

Referring to FIG. 6, the optical signal transferring apparatus 100 includes the first connector 120 configured for providing a connection to the display apparatus 200*a*, the second connector 130 configured for providing a connection to the source device 300*a*, and the signal transfer unit 110 including a plurality of optical fiber lines and a plurality of power lines.

The second connector 130 may include transmission modules TX1 through TXn which are configured to receive data from the source device 300*a* and to transmit the data by using one or more optical fiber lines, and a receiving module RX1 configured to receive data from the display apparatus 200*a*. The transmission modules TX1 through TXn may be used to transmit data, and one of the transmission modules TX1 through TXn and the receiving module RX1 may be respectively used to transmit and receive a control signal.

The first connector 120 may include receiving modules RX1 through RXn which are configured to receive data via one or more optical fiber lines and to transmit the data to the display apparatus 200*a*, and a transmission module TX1 configured to transmit data to the source device 300*a*. The receiving modules RX1 through RXn may be used to receive data, and one of the receiving modules RX1 through RXn and the transmission module TX1 may be respectively used to receive and transmit a control signal.

Hereinafter, a detailed configuration of an optical fiber line connected between TX and RX will be described below.

A transmission module TX1 130*a* may include a VCSEL driver 1, a VCSEL 2, a lens 3, and a prism 4 which are arranged on a PCB.

The VCSEL driver 1 is a circuit that is configured to control and drive one or more VCSELs by receiving data from a SerDes.

According to an embodiment, the VCSEL driver 1 may enable or disable a corresponding VCSEL under the control of the source device 300*a*.

The VCSEL 2 is a laser diode that is configured to convert an electrical signal received from the VCSEL driver 1 to an optical signal.

The lens 3 conveys light received from the VCSEL 2 to the prism 4, and the prism 4 reflects the received light to an optical fiber line 110*a*.

The optical fiber line 110*a* may transmit the received light to a receiving module RX1 120*a*.

The receiving module RX1 230*a* may include a prism 5, a lens 6, and a PD 7 and a TIA 8, which are arranged on a PCB.

The prism 5 may transmit the light received from the optical fiber line 110*a* to the PD 7 via the lens 6.

The PD 7 may convert the received light into an electrical signal and may transmit the electrical signal to the TIA 8.

The TIA 8 is an amplifier that is configured to convert current to a voltage, and may amplify the electrical signal received from the PD 7 and may transmit the amplified electrical signal to the SerDes.

Referring to FIG. 6, each transmission module includes a VCSEL driver and a VCSEL, and each receiving module includes a PD and a TIA. However, one VCSEL driver may be configured to control a plurality of VCSELs, and one TIA may be configured to control a plurality of PDs.

Figure 7:
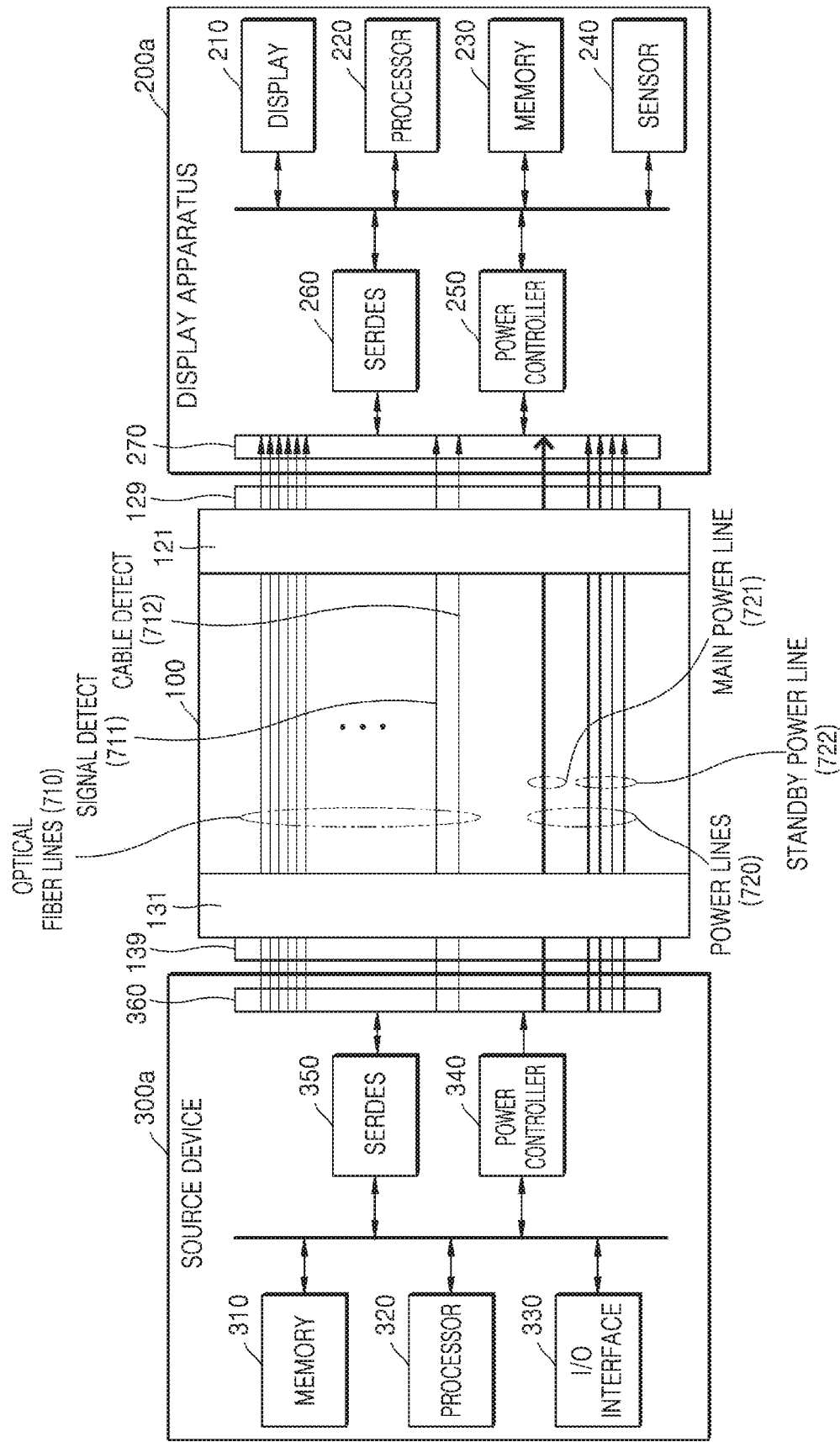
FIG. 7 is a diagram for describing an operation according to an embodiment by using detailed configurations of a display apparatus, an optical signal transferring apparatus, and a source device.

FIG. 7 is a diagram for describing an operation according to an embodiment by using detailed configurations of the display apparatus 200*a*, the optical signal transferring apparatus 100, and the source device 300*a*.

Referring to FIG. 7, the source device 300*a* may include a memory 310, a processor 320, an input/output (I/O) interface 330, a power controller 340, an SERDES 350, and an interface 360.

The memory 310 may store various types of setting data, program data including at least one instruction, application data, an operating system, or the like.

The processor 320 may control all components of the source device 300*a*, and may perform at least one operation by executing at least one instruction stored in the memory 310.

According to an embodiment, the processor 320 may determine a data source which is to be transferred to the optical signal transferring apparatus 100, according to an image source selected by the user, a pre-defined image source, or an image source which is detected via the I/O interface 330.

The I/O interface 330 is a terminal capable of selecting one or more image supply sources. The I/O interface 330 may include, for example, an HDMI interface, a USB interface, a local area network (LAN) interface, or a tuner.

The power controller 340 is a dedicated processor for controlling an interaction with the optical signal transferring apparatus 100, and may be embodied as a microcomputer.

The power controller 340 may control an exchange of data and a control signal between the power controller 340 and the optical signal transferring apparatus 100.

The power controller 340 may control the optical signal transferring apparatus 100 according to an operation mode, such as a standby mode or a normal mode, under the control of the processor 320.

The SERDES 350 indicates an interface that converts serial data into a parallel interface or a parallel interface into serial data.

The interface 360 may include a receptacle to connect the source device 300*a* with the plug 139 of the optical signal transferring apparatus 100.

The display apparatus 200*a* may include a display 210, a processor 220, a memory 230, a sensor 240, a power controller 250, a SERDES 260, and an interface 270.

The display 210 may be configured to display an image processed by the processor 220 or stored in the memory 230.

The processor 220 may control all components of the display apparatus 200*a*, and may perform at least one operation by executing at least one instruction stored in the memory 230.

The memory 230 may store various types of setting data, program data including at least one instruction, application data, an operating system, or the like.

The sensor 240 indicates a part that is configured to sense a user input, and may sense sources of various images selected by the user. For example, the sensor 240 may include an infrared (IR) receiver, a Bluetooth (BT) module, a physical key, etc., and may sense a source of supply such as a radio frequency (RF) broadcasting signal, a USB, an HDMI, a LAN, etc., selected by the user.

The power controller 250 indicates a circuit that is configured to provide power to each of the components of the display apparatus 200*a*, and may be embodied as a microcomputer.

In particular, according to an embodiment, the power controller 250 may perform a process for receiving power provided via the main power line or the standby power line included in the optical signal transferring apparatus 100 and providing the received power to each of the components of the display apparatus 200a.

The power controller 250 may control the optical signal transferring apparatus 100 according to an operation mode, such as a standby mode or a normal mode.

The interface 270 may include a receptacle to connect the display apparatus 200a with the plug 129 of the optical signal transferring apparatus 100.

A signal transfer unit of the optical signal transferring apparatus 100 includes a plurality of optical fiber lines 710 and a plurality of power lines 720. The plurality of optical fiber lines 710 may include a signal line 711 for signal detection, and a signal line 712 for cable detection.

The plurality of power lines 720 may include a main power line 721 for transferring main power, and a standby power line 722 for transferring standby power.

The display apparatus 200a may receive the main power from the main power line 721 in order to operate in a normal mode.

The display apparatus 200a may receive the standby power from the standby power line 722 in order to operate in a standby mode.

According to embodiments, the optical signal transferring apparatus 100 may have various operating modes, namely, an off mode, a standby mode, and a normal mode.

The off mode indicates a state in which no optical fiber cables are connected between a display apparatus and a source device or a state in which a power cable is not connected to the source device even when an optical fiber cable is connected between the display apparatus and the source device. In this off mode, the optical fiber cable does not perform any operation.

The standby mode is a state in which, because an optical fiber cable is connected between a display apparatus and a source device and a power cable is connected to the source device, standby power from the source device is provided to the display apparatus via the optical fiber cable. In this state, a display of the display apparatus may be in an off state or may output a predetermined screen image. In the standby mode, because the standby power is flowing into the display apparatus, processing is immediately performed in response to a user input.

The normal mode indicates a general operation state of a display apparatus, namely, a state in which, because an optical fiber cable is connected between the display apparatus and a source device and a power cable is connected to the source device, main power from the source device is provided to the display apparatus via the optical fiber cable.

Figure 8:
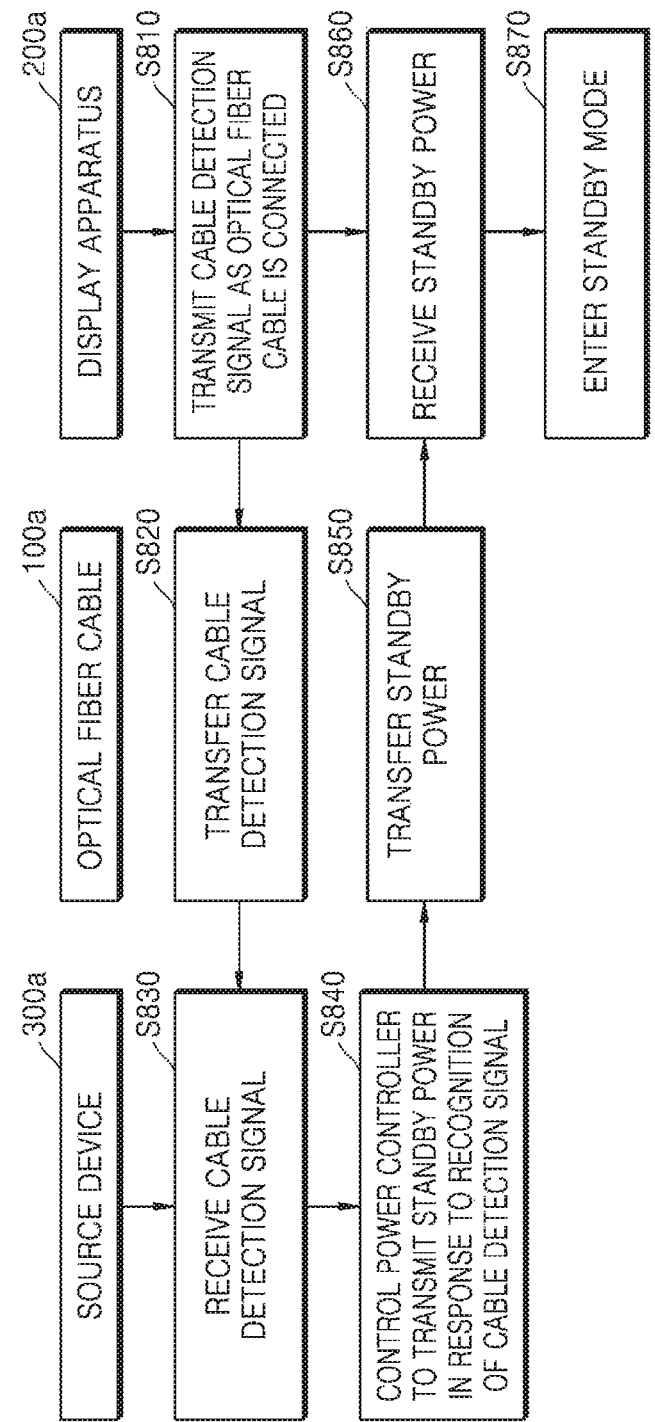
FIG. 8 is a flowchart of an example of an operation of an optical fiber cable that switches from a standby mode to a normal mode, according to an embodiment.

FIG. 8 is a flowchart of operations of the source device 300a, an optical fiber cable 100a, and the display apparatus 200a that are entering in the standby mode, according to an embodiment.

Referring to FIG. 8, in operation S810, the display apparatus 200a transmits a cable detection signal as the optical fiber cable 100a is connected.

For example, when the interface 270 of the display apparatus 200a is connected to the plug 129 of the optical fiber cable 100a, the display apparatus 200a may transmit the cable detection signal via a cable detection pin.

In operation S820, the optical fiber cable 100a transfers the cable detection signal.

For example, the cable detection line 712 of the optical fiber cable 100a may transfer the cable detection signal to the source device 300a.

In operation S830, the source device 300a receives the cable detection signal.

In operation S840, the source device 300a may control the power controller 340 to recognize the cable detection signal and transmit standby power in response to recognition of the cable detection signal.

In operation S850, the one or more standby power lines 722 of the optical fiber cable 100a transfer standby power received from the source device 300a to the display apparatus 200a.

In operation S860, the display apparatus 200a receives the standby power from the optical fiber cable 100a.

In operation S870, the power controller 250 of the display apparatus 200a may receive the standby power from the optical fiber cable 100a, and appropriately distribute the received standby power to each of the components of the display apparatus 200a such that the display apparatus 200a may enter the standby mode. Although the display 210 of the display apparatus 200a is in an off state in the standby mode of the display apparatus 200a, when a user input is received while consuming minimum power, the sensor 240 is able to detect the user input.

Figure 9:
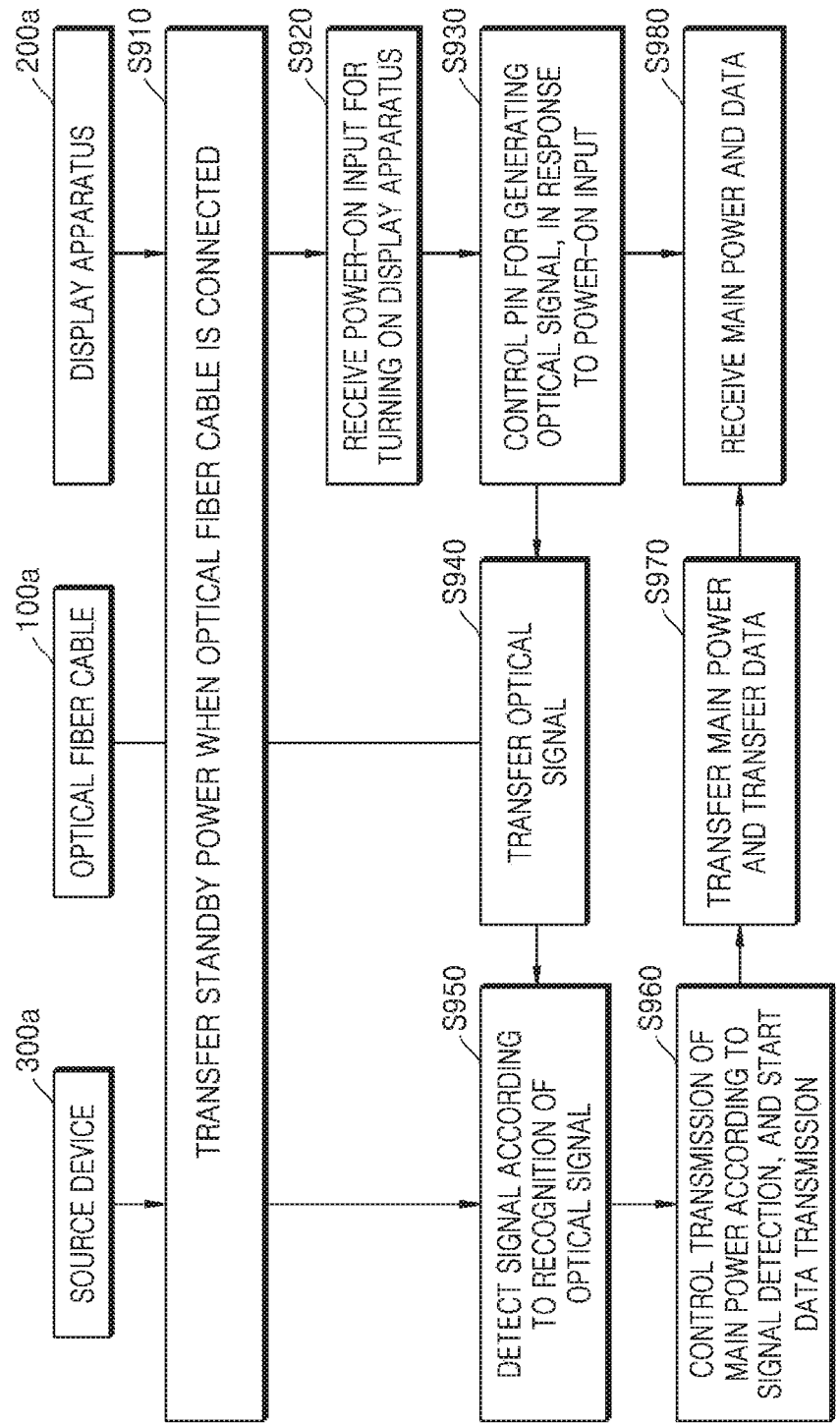
FIG. 9 illustrates signal states during an operation of the optical fiber cable of FIG. 8.

FIG. 9 is a flowchart of operations of the source device 300a, the optical fiber cable 100a, and the display apparatus 200a that are switching from the standby mode to the normal mode, according to an embodiment.

Referring to FIG. 9, in operation S910, the optical fiber cable 100a may transfer the standby power received from the source device 300a to the display apparatus 200a according to an operation as shown in FIG. 8.

In operation S920, the display apparatus 200a may receive a power-on input for turning on the display apparatus 200a via a remote control apparatus or the like.

In operation S930, the display apparatus 200a may control a pin for generating an optical signal, in response to the power-on input.

In other words, the power controller 250 of the display apparatus 200a may toggle an ACT pin of a first connector of the optical fiber cable 100a, in response to the power-on input.

Figure 10:
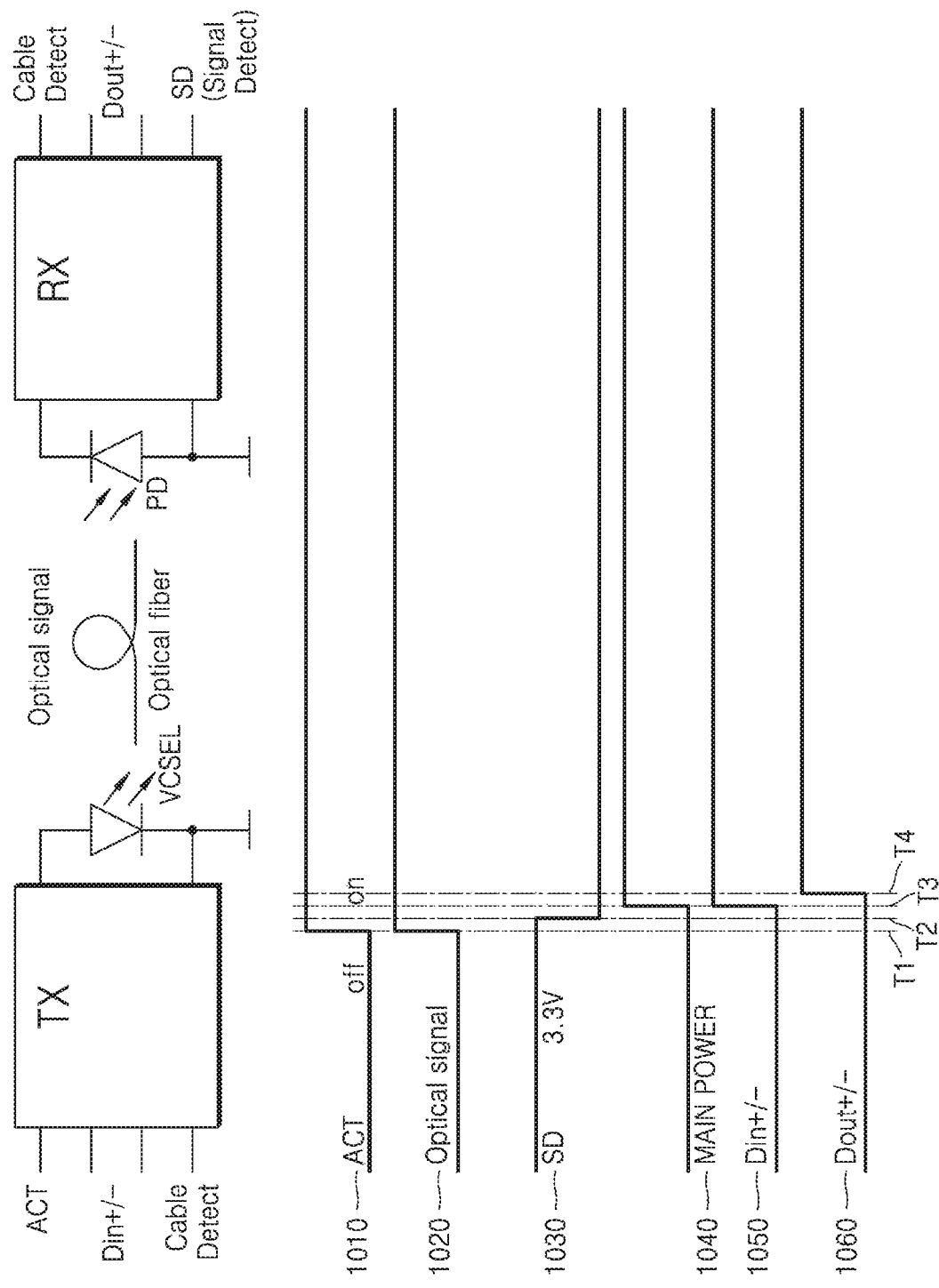
FIG. 10 is a flowchart of an example of an operation of an optical fiber cable that switches from a standby mode to a normal mode, according to an embodiment.

FIG. 10 illustrates signal states during an operation of the optical fiber cable 100a of FIG. 9.

Referring to FIG. 10, in response to a user input, the power controller 250 may toggle an ACT pin 1010 from among the plurality of pins provided on the receptacle 270 from on to off at a time point T1.

Referring back to FIG. 9, in operation S940, the optical fiber cable 100a transfers an optical signal to the source device 300a.

Referring to FIG. 10, according to toggling of the ACT pin 1010, the first connector 121 of the optical fiber cable 100a generates an optical signal 1020 in a light-emitting device. The generated optical signal 1020 may be transferred to the source device 300a via an optical fiber and the second connector 131.

In operation S950, the source device 300a detects a signal according to recognition of the optical signal.

Referring to FIG. 10, when the optical signal 1020 is transferred to the source device 300a via the optical fiber, a signal detection (SD) pin 1030 of a second connector is toggled at a time point T2. For example, the SD pin 1030 may be togged from 3.3V to 0V. Although the SD pin 1030 is toggled from high to low in FIG. 10, this is merely an example, and the SD pin 1030 may be toggle from low to high. Due to this togging of the SD pin 1030, the source device 300a may recognize that the optical signal has been detected. When the ACT pin 1010 of the first connector has been turned on, when the SD pin of the second connector is not toggled, the source device 300a may determine that the optical fiber cable 100a has been separated or cut off.

In operation S960, the source device 300a may control transmission of main power according to the signal detection and may start data transmission.

Referring to FIG. 10, according to detection by the SD pin 1030, the power controller 340 of the source device 300a may control transmission of the main power. In other words, a main power pin 1040 is driven at a time point T3. Together with this main power transmission control, the source device 300a may transmit data.

Referring back to FIG. 9, in operation S970, the optical fiber cable 100a may transfer the main power received from the source device 300a, to the display apparatus 200a via the main power line 721, and may transfer data to the display apparatus 200a via the one or more optical fiber lines 710.

In operation S980, the display apparatus 200a receives the main power and the data from the optical fiber cable 100a.

The power controller 250 of the display apparatus 200a may receive the main power via the main power line 721 of the optical fiber cable 100a, appropriately adjust the received main power, and transmit the adjusted main power to each of the components of the display apparatus 200a so that the display apparatus 200a enters a normal operation mode. Accordingly, both the display apparatus 200a and the source device 300a enter the normal operation mode, data transmission (Din 1050 and Dout 1060 of FIG. 10) may be conducted via the optical fiber.

As in the operation of FIG. 9, even when an optical fiber cable is connected between a display apparatus and a source device, instead of main power being transferred directly, the display apparatus transmits an optical signal to the source device, the source device detects the optical signal, and then main power transmission starts. Thus, sudden transfer of main power to the display apparatus when the display apparatus is not ready may be prevented.

Although FIG. 9 illustrates a case where an input of triggering an operation of a device is received by a display apparatus, a source device instead of the display apparatus may receive a user input.

For example, when the optical fiber cable 100a is connected between the display apparatus 200a and the source device 300a, standby power is transferred to the source device 300a, and the source device 300a is in the standby mode, the source device 300a may receive a user input of powering on the source device 300a via a remote control apparatus, such as a remote controller. In response to this user input, the power controller 340 of the source device 300a may transmit the main power from the source device 300a to the display apparatus 200a via the main power line 721.

In contrast with when the display apparatus 200a receives a user input, when the source device 300a receives a user input, triggering occurs in the source device 300a that supplies power, and thus the main power may be directly transmitted according to this triggering.

Figure 11:
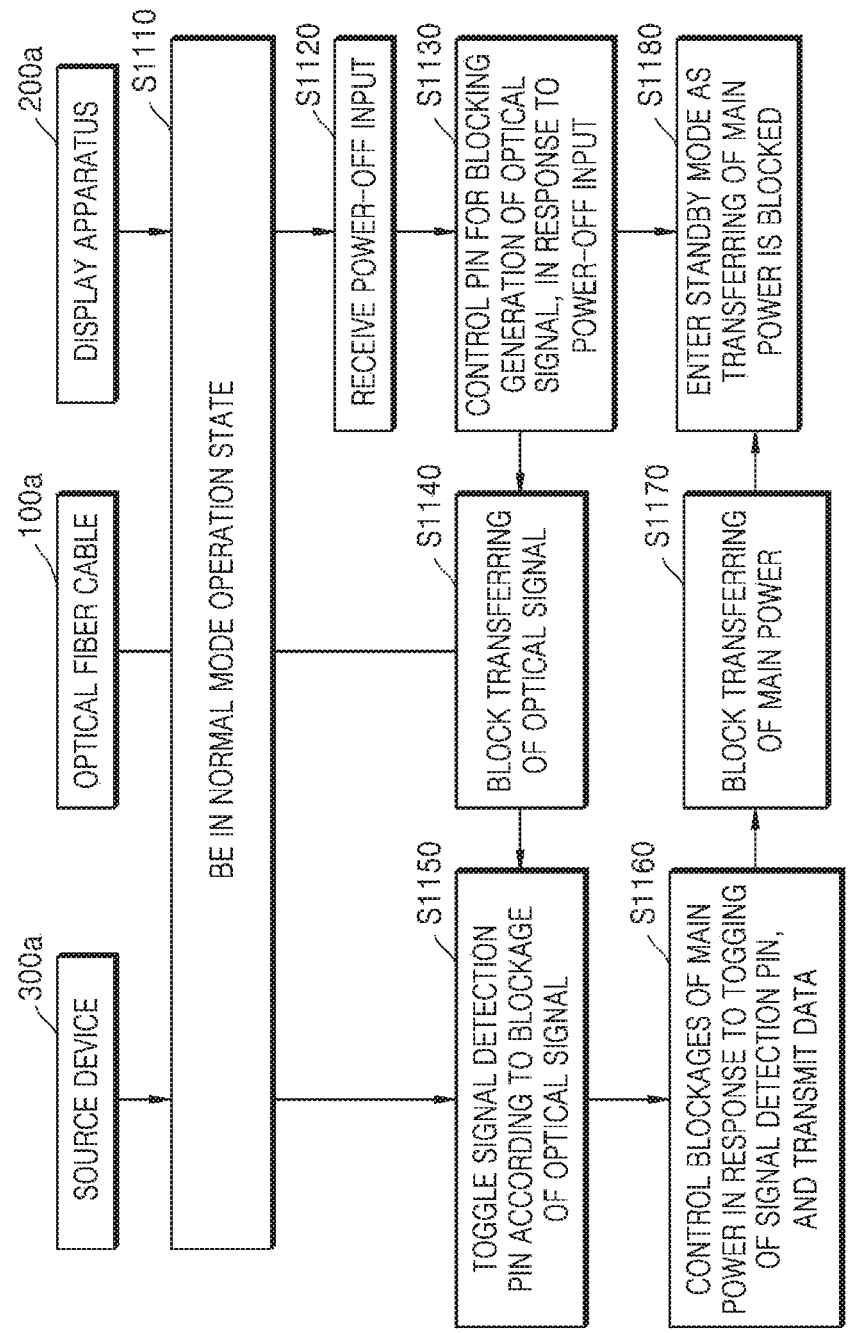
FIG. 11 is a flowchart of an operation of an optical fiber cable entering a standby mode from a normal operation mode, according to an embodiment.

FIG. 11 is a flowchart of an operation of the optical fiber cable 100a of entering a standby mode from a normal operation mode, according to an embodiment.

Referring to FIG. 11, in operation S1110, the optical fiber cable 100a transfers the main power from the source device 300a to the display apparatus 200a and also transfers data to the display apparatus 200a via one or more optical fiber lines, and thus the display apparatus 200a may be in a normal mode operation state.

In operation S1120, the display apparatus 200a may receive a power-off input from a user via a remote control apparatus.

In operation S1130, in response to the power-off input of the display apparatus 200a, the power controller 250 of the display apparatus 200a may toggle the ACT pin provided in the receptacle 270, thereby blocking power from being transferred to a VCSEL arranged on the first connector of the optical fiber cable 100a.

In operation S1140, the optical fiber cable 100a that has received no optical inputs from the VCSEL is blocked from transferring an optical signal.

In operation S1150, the source device 300a may recognize that an SD pin has been toggled according to blockage of the optical signal.

In operation S1160, the power controller 340 of the source device 300a may control blockages of the main power as the power controller 340 recognizes togging of the SD pin.

In operation S1170, transfer of the main power by the optical fiber cable 100a is blocked. In operation S1180, the display apparatus 200a may enter the standby mode as the transfer of the main power by the optical fiber cable 100a is blocked. Accordingly, the display apparatus 200a turns off the display 210 as the main power is blocked, and supplies only minimum power to the other components of the display apparatus 200a, and thus the display apparatus 200a may enter the standby mode.

FIG. 12 illustrates respective pin structures of plugs arranged on both ends of an optical fiber cable, according to an embodiment.

In an optical fiber cable according to an embodiment, a connector to be connected to a source device and a connector to be connected to a display apparatus are designed to have different shapes, such that mis-insertion by a user is prevented and a design pursued by a display system is completed.

A connector 1210 to be coupled with a source device has a pin-map of a two-row layout, and accordingly may have a structure in which it is combined in a PCB edge type while minimizing an outer size of the connector 1210.

A connector 1220 to be coupled with a display apparatus has a pin-map of a one-row layout. When the connector 1220 is perpendicularly connected to a PCB and is accordingly perpendicularly connected to the display apparatus and inserted into the display apparatus, finishing touches are performed without outward protruding portions, and thus a sense of unity between the connector 1220 and the display apparatus may be maximized visually and tactily.

Pins that constitute a connector may be roughly broken down into power pins, high-speed signal pins, and general signal pins. The high-speed signal pins and the general signal pins may be designed to be apart from each other in order to prevent degradation of high-speed signal communication performance due to power noise.

In case of pins allocated for high-voltage power from among the power pins, the pins may be spaced sufficiently apart from each other to secure a safe separation distance from neighboring pins and metal shells, thereby suppressing spark occurrence. When it is difficult to physically space the metal shells apart from the high-voltage power pins, portions of the metal shells that are adjacent to the high-voltage power pins may be cut off to secure a separation distance therebetween.

Referring to FIG. 12, pins for high-voltage power transfer employ a two-contact contact portion shape to have a function of preventing pin abrasion due to long-time usage.

Figure 13:
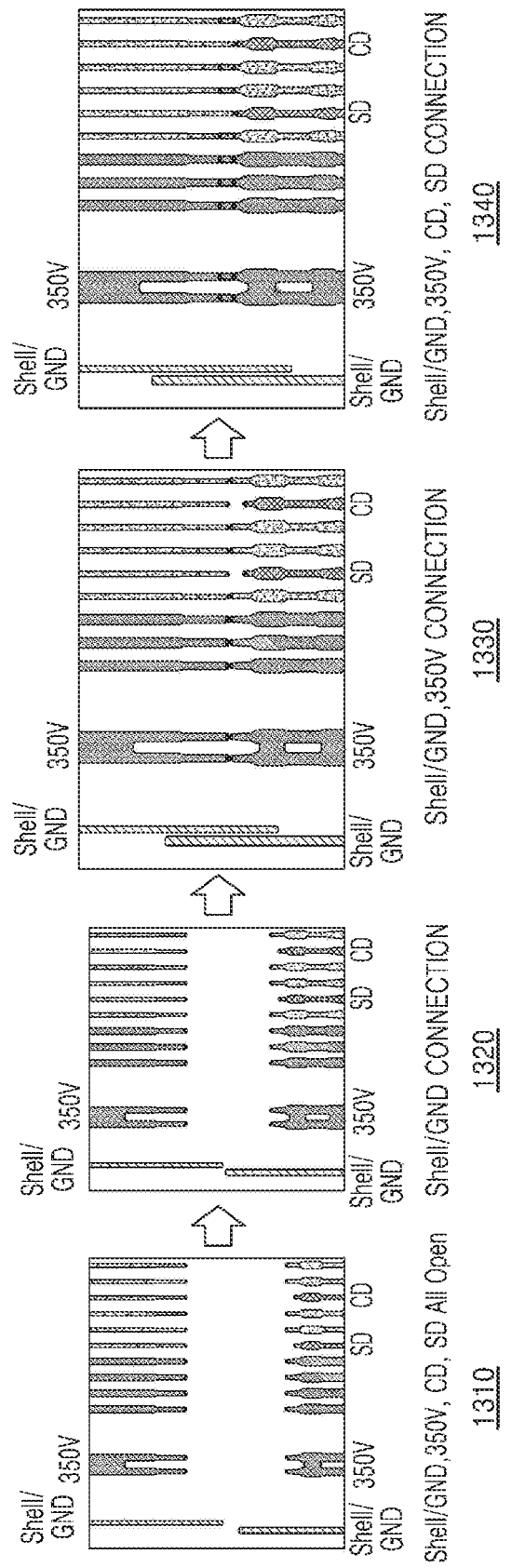
FIG. 13 is a schematic diagram for illustrating a coupling structure between a plug and a receptacle, according to an embodiment.

FIG. 13 is a schematic diagram for illustrating a coupling structure between a plug and a receptacle, according to an embodiment.

Cable detection (CD) pins and SD pins within a plug for checking cable insertion are designed to be shorter than the other pins, and accordingly are connected to a receptacle after the plug is completely inserted into the receptacle. When the plug is detached from the receptacle, the CD pins and the SD pins are first disconnected from the receptacle, and thus a source device and a display apparatus may quickly recognize this detachment and may control power. The CD pins may be connected to an ADC or GPIO port of a device and thus may be used as a method of checking a cable normal connection according to a voltage level by using a pull-up or pull-down or identifying a cable manufacturer or a manufacturing date.

Referring to FIG. 13, a reference numeral 1310 indicates a state in which shell/ground (GND) pins, high-voltage pins, SD pins, and CD pins are all open. A reference numeral 1320 indicates a state in which the shell/GND pins are connected to each other and the high-voltage pins, the SD pins, and the CD pins are open. A reference numeral 1330 indicates a state in which the shell/GND pins and the high-voltage pins are connected. A reference numeral 1340 indicates a state in which the shell/GND pins, the high-voltage pins, the SD pins, and the CD pins are all connected.

As such, the SD pins and the CD pins are designed to be shorter than the other pins such that the SD and CD pins are recognized only when a connector is completely inserted. This enables power control (On) to be performed after the connector is completely inserted, and thus power supply in an unstable connection state may be prevented. Even when the connector is unexpectedly detached during an operation of a display system, changes in the SD and CD pins are first recognized, and thus power pins are disconnected after power control (OFF) is performed, leading to prevention of spark occurrence due to a high voltage.

GND pins which are used for low voltages may be generally designed to be connected to an Earth ground of a display panel to thereby minimize a power ripples and stabilize power.

GND pins which are used for high voltages may be designed to be separated from the GND pins used for low voltages to be used in a floating GND state, such that a user has no electric shocks even when a cable is unexpectedly disconnected. According to a detailed principle, because GND for high voltages and Earth GND are separated from each other, a high voltage power line (+) is not in a high-voltage state, compared with Earth GND typically connected via the foot of a human being, and thus an electric shock may not occur when the high voltage power line (+) contacts a human body.

According to an embodiment, high-voltage power parts may be designed to be apart from each other by using two or more layers such that stable power supply may be achieved.

The high-voltage power parts may be arranged on an outermost portion of a PCB such that the high-voltage power parts minimally affect low-voltage or high-speed signal pins and general signals that are adjacent to the high-voltage power parts.

Layers are designed apart from a special signal layer or a digital GND (DGND) layer, which serves as a reference for signals such that power influences are minimized.

Figure 14:
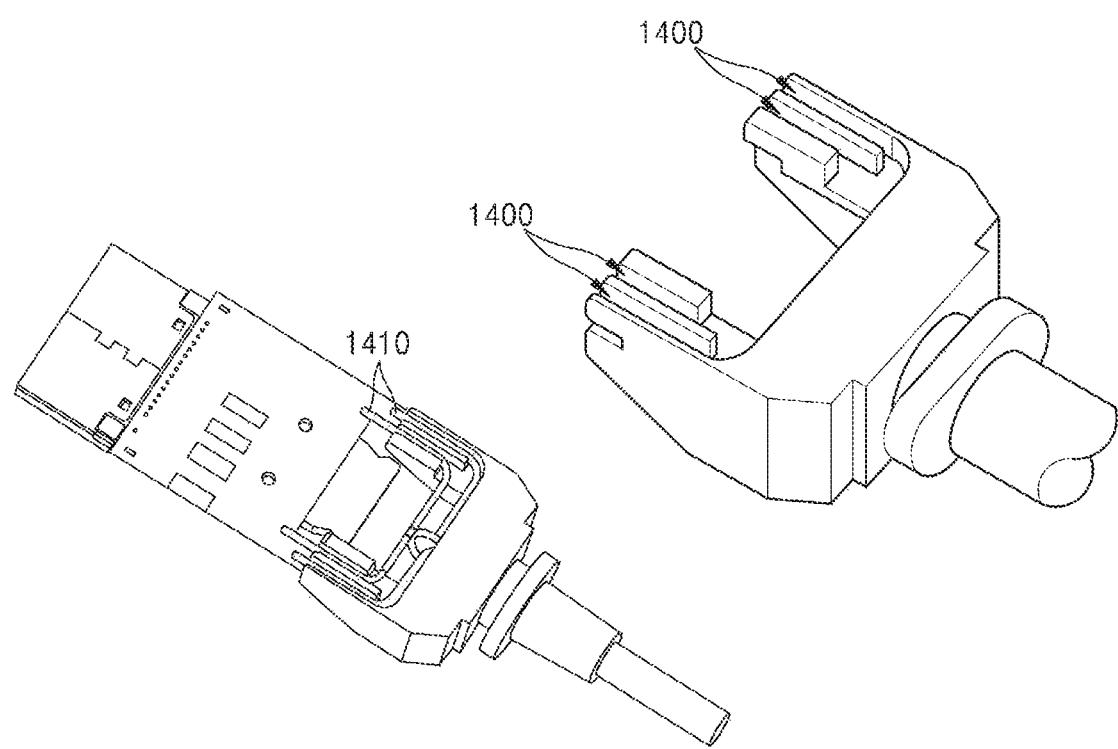
FIG. 14 is a view illustrating a structure of arranging a high-voltage power line on a connector, according to an embodiment.

FIG. 14 is a view illustrating a structure of arranging a high-voltage power line on a connector, according to an embodiment.

Referring to FIG. 14, in an internal mechanism structure of the connector, a slot structure 1400 capable of fixing special copper wires 1410 is applied to a structure for coupling an external case with a PCB and fixing them, and thus physically fixes the copper wires 1410 to the PCB even when a soldered portion between the copper wires 1410 and the PCB is broken in an unexpected situation, such as an electrical short or over-current, thereby preventing occurrence of an additional electrical accident (short-circuit between the copper wires 1410 and another portion of the PCB or a short-circuit between the copper wires 1410 and metal shells).

According to an embodiment, a power cable is connected to only one of a source device and a display apparatus connected via an optical fiber cable such that a user may conveniently arrange the display apparatus with an increased interior decoration effect.

Methods of operating the above-described apparatuses may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

The embodiments should be considered in descriptive sense only and not for purposes of limitation. Descriptions of features or aspects within each embodiment should typically be considered as available for other similar features or aspects in other embodiments.

While the present disclosure has been particularly shown and described with reference to embodiments thereof, it will be understood by those of ordinary skill in the art that various changes in form and details may be made therein without departing from the spirit and scope of the present disclosure as defined by the following claims.

What is claimed is:

1. An optical signal transferring apparatus comprising:
   a signal transfer unit comprising one or more optical signal lines and one or more power lines;
   a first connector which is arranged on a first end of the signal transfer unit, configured to convert an optical signal to and from an electrical signal, and connectable to an electronic apparatus to transfer the electrical signal to and from the electronic apparatus; and
   a second connector which is arranged on a second end of the signal transfer unit, configured to convert an optical signal to and from an electrical signal, and connectable to a source device to transfer the electrical signal to and from the source device,
   wherein,
      in response to a power-on input to turn on the electronic apparatus, at least one optical signal line of the one or more optical signal lines is configured to transfer an optical signal from the first connector connected to an electronic apparatus to the second connector connected to a source device, and in response to a detection of the transferred optical signal by the source device, at least one power line of the one or more power lines is configured to supply power from the second connector connected to the source device to the first connector connected to the electronic apparatus, and at least one optical signal line of the one or more optical signal lines is configured to transfer data from the second connector connected to the source device to the first connector connected to the electronic apparatus.

2. The optical signal transferring apparatus of claim 1, wherein the one or more power lines comprises at least one standby power line and at least one main power line, and wherein the signal transfer unit is further configured to supply main power by using the at least one main power line, in response to the detection of the transferred optical signal.

3. The optical signal transferring apparatus of claim 1, wherein the signal transfer unit is further configured to:

block transferring of the transferred optical signal to the source device in response to a power-off input of the electronic apparatus, and block the supply of the power from the source device to the electronic apparatus in response to a detection of the blocking of the transferring of the transferred optical signal.

4. The optical signal transferring apparatus of claim 1, wherein the one or more power lines comprises at least one standby power line and at least one main power line, and the signal transfer unit is further configured to supply standby power received from the source device to the electronic apparatus via the at least one standby power line, in response to recognition that the first connector is connected to the electronic apparatus and the second connector is connected to the source device, and supply main power received from the source device to the electronic apparatus via the at least one main power line in response to a power-on input of the electronic apparatus.

5. The optical signal transferring apparatus of claim 1, wherein each of the first connector and the second connector comprises one or more printed circuit boards (PCBs), and the one or more signal lines and the one or more power lines are arranged apart from each other on each of the one or more PCBs.

6. The optical signal transferring apparatus of claim 5, wherein the one or more optical signal lines comprise a detection signal line for recognizing a detection signal, and a pin on at least one of the first connector and the second connector corresponding to the detection signal line has a shorter length than a length of a pin on at least one of the first connector and the second connector corresponding to another signal line.

7. The optical signal transferring apparatus of claim 1, wherein the electronic apparatus is a receiving apparatus configured to receive a video/audio signal, and the source device is a transmitting apparatus configured to transmit the video/audio signal.

8. A system including the optical signal transferring apparatus of claim 1 and the electronic apparatus, wherein the electronic apparatus comprises:

an interface connectable to the optical signal transferring apparatus configured to transfer data and power from the source device to the electronic apparatus;

a power controller configured to control the power received from the optical signal transferring apparatus; and a processor configured to:

control the interface to generate an optical signal in the optical signal transferring apparatus in response to a power-on input to turn on the electronic apparatus;

receive the power and the data from the source device via the optical signal transferring apparatus in response to detection of the generated optical signal by the source device; and process the received data.

9. The system of claim 8, wherein the processor of the electronic apparatus is further configured to toggle one pin from among a plurality of pins provided on the interface in order to generate the optical signal within the optical signal transferring apparatus, and receive main power from the source device via a main power line of the optical signal transferring apparatus in response to detection of the generated optical signal.

10. The system of claim 8, wherein the processor of the electronic apparatus is further configured to control the interface to block the generation of the optical signal in the optical signal transferring apparatus in response to an input of powering off the electronic apparatus, and enter a standby mode according to interruption of the supply of the power from the source device in response to the blocking of the generation of the optical signal.

11. A system including the optical signal transferring apparatus of claim 1 and the source device, wherein the source device comprises:

an interface connectable to the optical signal transferring apparatus configured to transfer data and power from the source device to the electronic apparatus;

a power controller configured to control the power supplied to the optical signal transferring apparatus; and a processor configured to:

detect an optical signal generated by the optical signal transferring apparatus in response to a power-on input to turn on the electronic apparatus and received from the optical signal transferring apparatus, and transfer the power and the data to the electronic apparatus via the optical signal transferring apparatus in response to the detection of the optical signal.

12. The system of claim 11, wherein the processor of the source device is further configured to control the power controller to transmit standby power in response to connection of the optical signal transferring apparatus, and control the power controller to transmit main power in response to the detection of the optical signal.

13. The system of claim 11, wherein the processor of the source device is further configured to detect blocking of transferring of the optical signal in the optical signal transferring apparatus, in response to an input of powering off the electronic apparatus, and control the power controller to interrupt the supply of the power to the source device in response to the detection of the blocking of the transferring of the optical signal.

14. A method of operating an optical signal transferring apparatus, the optical signal transferring apparatus comprising: a first connector, a second connector, and a signal transfer unit including one or more optical signal lines configured to transfer an optical signal between the first connector connected to an electronic apparatus and the second connector connected to a source device, and one or more power lines configured to transmit power between the first connector connected to the electronic apparatus and the second connector connected to the source device, wherein the first connector is arranged on a first end of the signal transfer unit, configured to convert an optical signal to and from an electrical signal, and connectable to the electronic apparatus to transfer the electrical signal to and from the electronic apparatus, and wherein the second connector is arranged on a second end of the signal transfer unit, configured to convert an optical signal to and from an electrical signal, and connectable to the source device to transfer the electrical signal to and from the source device, the method comprising:

transferring the optical signal from the first connector connected to the electronic apparatus to the second connector connected to the source device in response to a power-on input to turn on the electronic apparatus; and transferring, to the first connector connected to the electronic apparatus, power and data which are received from the second connector connected to the source device in response to detection of the transferred optical signal by the source device, respectively, via the one or more power lines and the one or more signal lines.

15. The method of claim 14, wherein the one or more power lines comprises at least one standby power line and at least one main power line, and the method further comprises transferring main power received from the source device via the at least one main power line in response to recognition of a detection signal.

16. The method of claim 14, further comprising:

blocking the transferring of the optical signal from the electronic apparatus to the source device in response to a power-off input of the electronic apparatus; and blocking the transfer of the power from the source device to the electronic apparatus in response to recognition of the blocking of the optical signal of the source device.

17. The method of claim 14, wherein the one or more power lines comprises at least one standby power line and at least one main power line, and the method further comprises:

transferring standby power received from the source device to the electronic apparatus via the at least one standby power line in response to recognition that the first connector is connected to the electronic apparatus and the second connector is connected to the source device; and transferring main power received from the source device to the electronic apparatus via the at least one main power line in response to a power-on input of the electronic apparatus.

18. A method of operating a system including the electronic apparatus and the optical signal transferring apparatus of claim 1, the electronic apparatus comprising: an interface connectable to the optical signal transferring apparatus configured to transfer data and power from the source device to the electronic apparatus; a power controller configured to control the power received from the optical signal transferring apparatus; and a processor, the method comprising:

performing, by the processor, operations including:

controlling the interface to generate an optical signal in the optical signal transferring apparatus in response to a power-on input to turn on the electronic apparatus;

receiving the power and the data from the source device via the optical signal transferring apparatus in response to detection of the generated optical signal by the source device; and processing the received data.

19. A method of operating a system including the source device and the optical signal transferring apparatus of claim 1, the source device comprising: an interface connectable to the optical signal transferring apparatus configured to transfer data and power from the source device to the electronic apparatus; a power controller configured to control the power supplied to the optical signal transferring apparatus; and a processor, the method comprising:

performing, by the processor, operations including:

detecting an optical signal generated by the optical signal transferring apparatus in response to a power-on input to turn on the electronic apparatus and received from the optical signal transferring apparatus; and transferring the power and the data to the electronic apparatus via the optical signal transferring apparatus in response to the detection of the optical signal.

\* \* \* \* \*